Nov. 10, 1964  S. S. DE FOREST  3,156,308
ADJUSTABLE TRACTOR HITCH SUPPORT FOR FENCE POST DRIVER
Filed Feb. 1, 1961  3 Sheets-Sheet 1

INVENTOR.
SHERWOOD S. DE FOREST
BY Donald G. Dalton

ATTORNEY

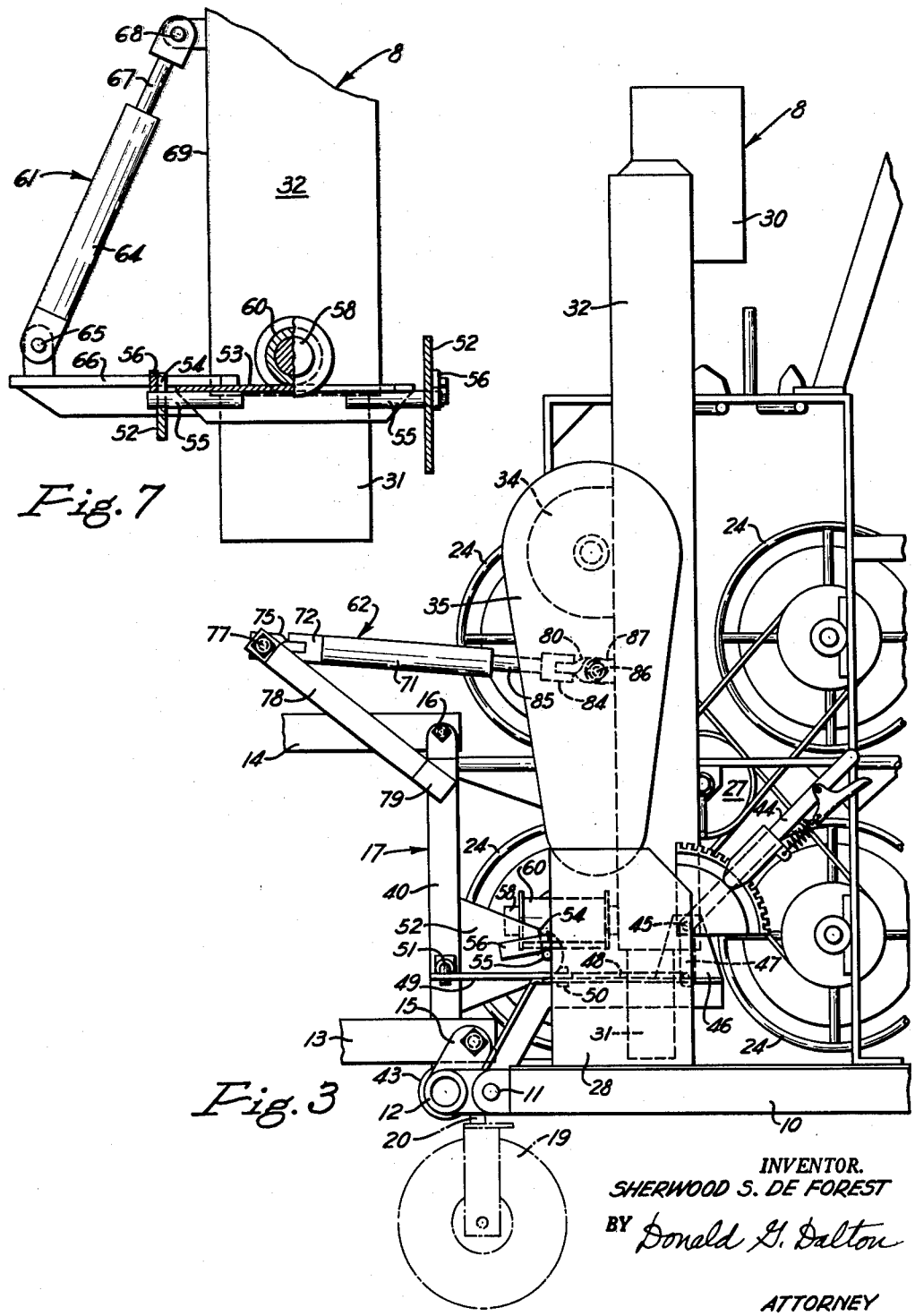

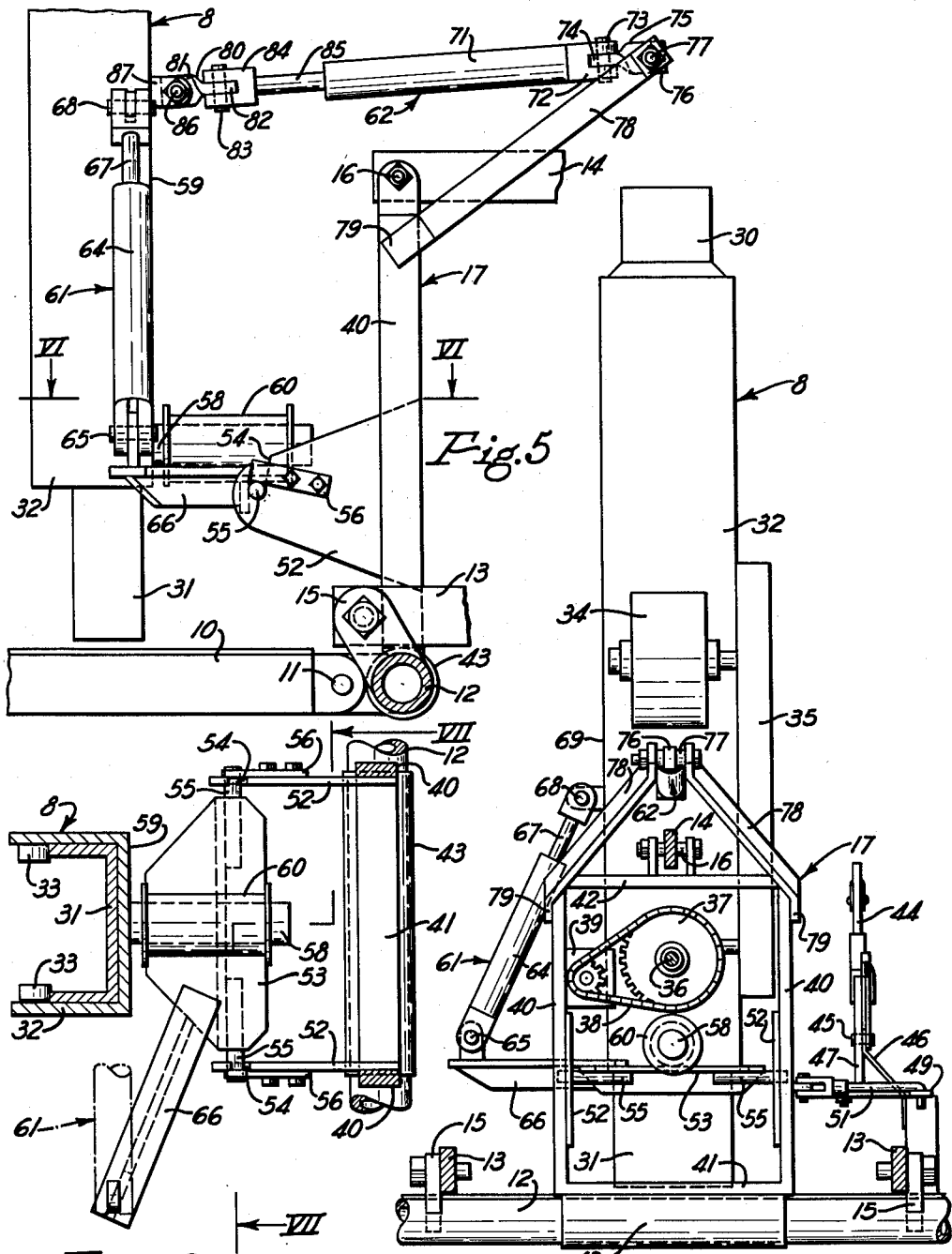

United States Patent Office 3,156,308
Patented Nov. 10, 1964

3,156,308
ADJUSTABLE TRACTOR HITCH SUPPORT FOR FENCE POST DRIVER
Sherwood S. De Forest, Coraopolis, Pa., assignor to United States Steel Corporation, a corporation of New Jersey
Filed Feb. 1, 1961, Ser. No. 86,422
5 Claims. (Cl. 173—43)

This invention relates to apparatus for erecting wire fence and, as indicated, to an adjustable support for a fence post driver that forms a part of such apparatus. The fence post driver support of this invention, more specifically, comprises a tractor hitch that includes a horizontal draft bar supported by a pair of laterally spaced lift links, and an adjustable mounting for the post driver on the draft bar that provides both for angular movement to a vertical position and for lateral movement on the draft bar to compensate for sloping and irregular ground surfaces over which the apparatus may be drawn by a tractor.

The fence erecting apparatus mentioned above has as its principal purpose the reduction of manual labor required for erecting farm and highway fencing. In addition to the fence post driver and mounting of this invention, it comprises a carriage that is drawn along a fence line by a tractor and furnishes a support for a fence wire dispenser that operates to string fence wire along a line of fence posts and to place such wire under the tension required for fastening it to the fence posts. At spaced intervals along the fence line, the post driver of this invention is operated to install the fence posts. As indicated, the fence post driver is mounted on the tractor hitch draft bar which will occupy either a horizontal or an inclined position determined by the contour of the ground at the point where a fence post is to be installed. One of the principal objects of this invention is to provide an adjustable mounting for the fence post driver on the tractor hitch draw bar that will facilitate its being positioned for driving fence posts vertically in positions accurately arranged along the fence line when the tractor hitch draw bar occupies a horizontally inclined position.

Other objects and advantages of the invention will become apparent from the following description.

In the drawings, there is shown a preferred embodiment of the invention. In this showing:

FIGURE 3 is a fragmentary elevational view looking from the right of FIGURE 2;

FIGURE 4 is a fragmentary front elevational view of the fence post driver and the tractor hitch support therefor;

FIGURE 5 is a fragmentary elevational view taken in a direction looking from the left of FIGURE 4;

FIGURE 6 is a sectional view taken along the line VI—VI of FIGURE 5 and in which the fence post driver is shown diagrammatically and one of the motors for adjusting its vertical position is shown in dotted lines; and FIGURE 7 is a sectional view taken along the line VII—VII of FIGURE 6.

Figure 1:
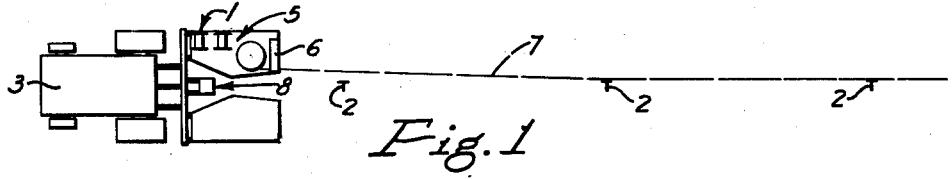
FIGURE 1 is a diagrammatic plan view of the fence erecting apparatus for stringing fence wire along a line of fence posts to which the apparatus of this invention relates.

The fence wire erecting apparatus to which this invention relates, as shown in FIGURE 1, comprises a carriage that is pulled forwardly along a line of fence posts 2 by a tractor 3, the carriage being connected with the tractor by a conventional three-point hitch in a manner to be described. A fence wire dispenser 5 and a tensioning clamp 6, which form the subject matter of copending applications Serial No. 87,833, filed February 8, 1961, and Serial No. 83,706, filed January 19, 1961, now respectively Patent Nos. 3,098,624 and 3,104,863, and to which reference is made for a more detailed explanation and showing thereof, are mounted on the carriage 1 and operate to string fence wire, designated diagrammatically by the broken line 7, along the line of fence posts 2 as the carriage 1 is pulled forwardly by the tractor 3. After being placed under tension, the wire 7 is fastened to the fence posts 2. A fence post driver 8 at the forward end of the carriage 1 is operated to install fence posts 2 at spaced intervals along the fence line. As indicated this invention is directed to the tractor hitch mounting for the fence post driver 8 and is concerned with improvements that compensate for irregularities in the ground surface over which the tractor 3 and carriage 1 travel.

Figure 2:
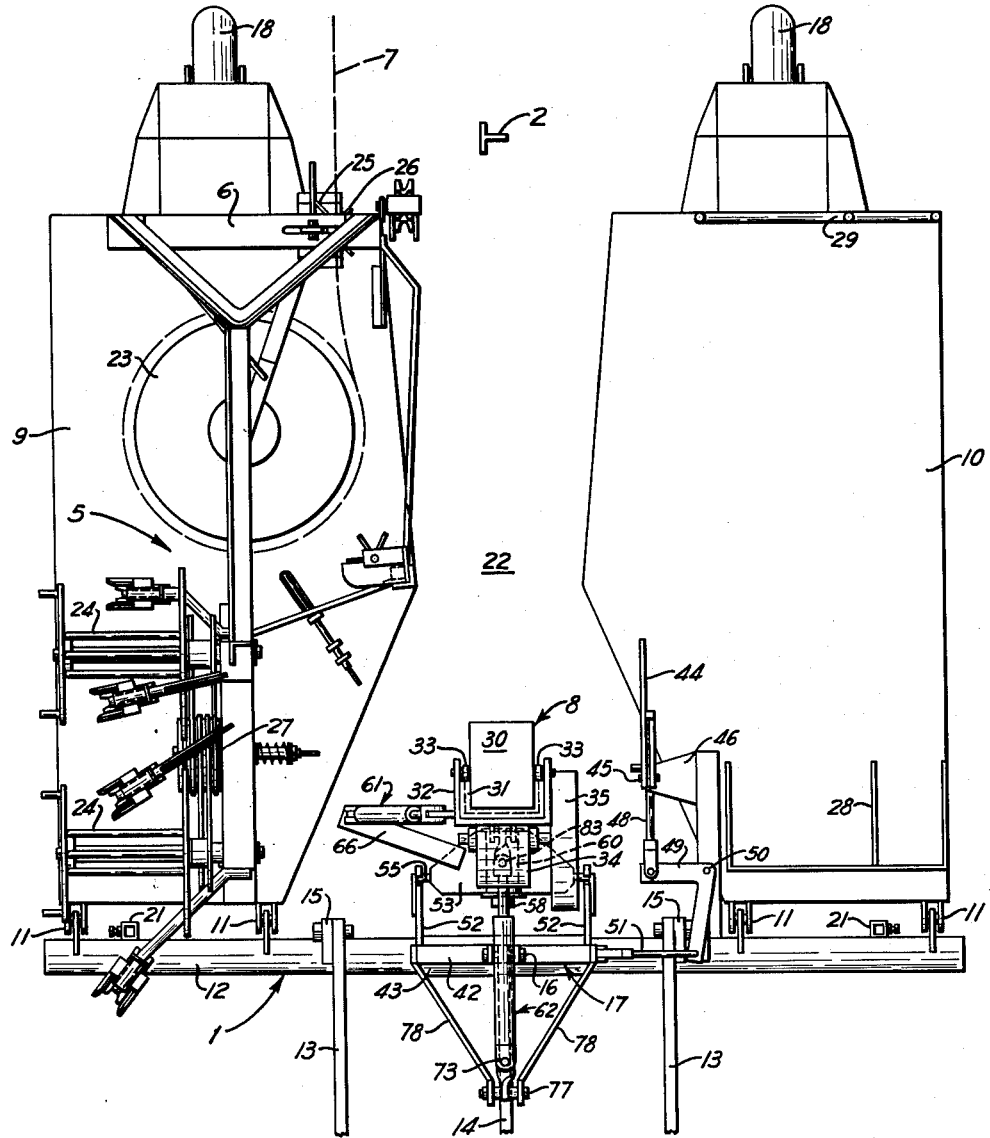
FIGURE 2 is an enlarged plan view of the fence erecting machine shown in FIGURE 1 and which shows the apparatus of this invention in greater detail.

As shown in FIGURE 2 of the drawings, the carriage 1 comprises a pair of laterally spaced platforms 9 and 10 that have pivotal connections 11 at their forward ends to a draft bar 12. The connection of the draft bar 12 with the tractor 3 comprises a conventional three-point tractor hitch which includes a pair of lift links 13 and a stabilizing link 14 (FIGURE 3). The lift links 13 are pivotally connected to lugs 15 on the draft bar 12, and the stabilizing link 14 has a pivotal connection 16 to the upper end of a frame 17 that is mounted on the draft bar 12 in a manner to be described. When attached to a tractor, the links 13 and 14 furnish a support for the forward end of the carriage 1 which is supported at its other end for rolling movement over the ground by casters 18 at the trailing ends of each of the platforms 9 and 10. When disconnected from the tractor, the forward end of the carriage 1 is supported by detachable casters 19 which have upwardly extending stems 20 that are removably secured in brackets 21 secured to the draft bar 12.

The fence post driver 8 has a central location on the draft bar 12 and is arranged in the space 22 between the platforms 9 and 10. The central arrangement of the fence post driver 8 in the space 22 provides for free forward movement of the carriage to the next fence post driving position after the driver 8 has been operated to drive a fence post into the ground. The platform 9 furnishes a support for the fence wire dispenser 5 mentioned above, which comprises a vertical reel 23 that is adapted to dispense woven wire fence from a coil supported thereon, and a plurality of horizontal reels 24 that are adapted to dispense plural strands of fence wire, such as barbed wire, from coils supported thereon. The fence wire 7, with reference to FIGURE 1, is attached to one of the fence posts 2 and is dispensed from the reels 23 or 24 upon forward movement of the carriage 1 along a line of fence posts by the tractor 3. The fence wire 7 moves through a vertical pass between tensioning clamping elements 25 and 26 that form part of the tensioning clamp 6 and are operated into clamping engagement with the fence wire 7 so that subsequent forward movement of carriage 1 will operate to apply tension to the wire 7 prior to its being fastened to the posts 2 along which it has been strung. The horizontal reels 24 are provided with chain and sprocket drives to a tensioning unit 27 that operates to apply tension to plural strands of fence wire independently of the tensioning clamp 6. As indicated above, the tensioning clamp 6 and the wire dispenser 5, which comprises the reels 23 and 24, form the subject matter of the patents mentioned above.

The platform 10 in operation furnishes a support for carrying a plurality of fence posts and, for this purpose, has vertically extending members 28 and 29 at opposite ends thereof between which the ends of the fence posts 2 are received to hold them in position on the platform 10. In addition, the platform 10 furnishes a stand for a workman operating the machine.

Since the fence post driver 8 is conventional, it will be sufficient to indicate that it includes a fence post driving element 30 that with reference to FIGURE 6 is mounted on the upper end of a U-shaped supporting member 31, which in turn is mounted for guided movement in a U-shaped guide housing 32 that has guide rollers 33 for holding the channel 31 assembled in the channel 32. Upon release from the position shown in FIGURE 3, the supporting channel 31 and the driving element 30 gravitate downwardly to a position in which the element 30 engages with a driving impact the upper end of a fence post to drive it into the ground. The element 30 and channel 31 are thereafter returned to the position shown in FIGURE 3 for another post driving operation by a friction wheel (not shown) in a housing 34 that is operated by a mechanical drive 35 from a conventional tractor power take-off 36. The friction wheel has a manual control (not shown) for moving it into and out of driving engagement with the channel member 31 and, for this purpose, the supporting housing 32 has an opening (not shown) through which the friction wheel engages with the channel member 31 to elevate it and the driving element 30 to the position shown in FIGURE 3 after each post driving operation. As shown in FIGURE 4, the tractor power take-off 36, in addition to operating the mechanical drive 35 through speed reduction gearing (not shown), rotates a gear 37 that forms part of a chain belt drive 38 for a hydraulic pump 39, which supplies fluid pressure for positioning control motors to be described.

As indicated, the mounting of the post driver 8 provides for lateral adjustment of its position on the carriage 1. For this purpose, the frame 17 on which it is mounted is supported for shifting movement on the draft bar 12. More specifically, the frame 17, as best shown in FIGURE 4, has a rectangular shape and is comprised of laterally spaced side bars 40, a bottom bar 41 and a top bar 42, the stabilizing link 14 being pivotally connected to the top bar 42 at a point centrally thereon. The bottom bar 41 is welded to a cylindrical tube 43 that has a sliding support on the draft bar 12 for axial shifting movement between the lift links 13 and the lugs 15 on the draft bar 12. Adjustment of the lateral position of the frame 17 and thereby the position of the post driver 8 is controlled manually through a lever 44 that has a pivot connection 45 at its lower end with a bracket 46 that is secured to the draft bar 12. A rocker arm 47 is secured to the lower end of the lever 44 and has an operating connection through a link 48 with one arm of a bell crank 49, which has a pivot connection 50 with the bracket 46. The other arm of the bell crank 49 is connected by a link 51 to one of the frame side bars 40. Pivotal movement of the lever 44 through the bell crank connections 45–51 operates to shift the frame 17 on the draft bar 12 to thereby adjust the position of the post driver 8 in a direction laterally of the carriage 1.

The post driver 8 is supported on the frame 17 by a pair of laterally spaced bracket plates 52 and a mounting plate 53. The plates 52 are secured to the frame side bars 40 in parallel positions projecting rearwardly therefrom. As best shown in FIGURE 5 each of the plates 52 has an upwardly opening notch 54 formed in its trailing end. Trunnions 55 projecting from opposite ends of the mounting plate 53 are received in the notches 54 and support the mounting plate 53 on the bracket plates 52 for rotational movement about an axis parallel to the axis of the draft bar 12. The trunnions 55 are held against movement out of the mounting notches 54 by bars 56 that are detachably connected to the side plates 52.

The mounting of the post driver 8 on the mounting plate 53 provides for its pivotal movement about an axis that extends transversely of the axis of the draft bar 12. Such mounting comprises a gudgeon 58 that is secured to and projects forward from the front surface 59 of the driver housing 32 at a point centrally thereof. The gudgeon 58 is journaled in a bearing 60 secured to the top surface of the mounting plate 53.

The pivotal support of the plate 53 that is provided by the trunnions 55 and the pivotal support of the post housing 32 that is provided by the bearing 60 provide for independent pivotal movement of the post driver 8 about axes that extend at right angles relative to each other. Adjustment of the vertical position of the post driver 8 about these axes is effected by a pair of double-acting fluid pressure motors 61 and 62. Each of the motors 61 and 62 is a conventional expansible chamber double-acting hydraulic motor that has fluid pressure connections (not shown) at opposite ends thereof and a reversing valve (not shown) for reversing the flow of hydraulic fluid through opposite ends thereof. Such reversing valves are preferably the conventional three-position type having two operating positions for effecting reverse operation of the motors 61 and 62 and a neutral position in which the flow of hydraulic fluid to and from opposite ends of the motors 61 and 62 is blocked to lock them in a selected position of adjustment. The hydraulic fluid for operating the motors 61 and 62 is supplied by the pump 39. Since the fluid pressure connections and reversing valves for controlling the operation of the motors 61 and 62 are conventional, they have not been shown in the drawings.

The motor 61 controls the rotational movement of the post driver 8 about the axis of the bearing 60. As best shown in FIGURE 7 it comprises a cylinder 64 that has a pivot pin and clevis connection 65 at its lower end to a supporting bracket 66 that is secured to the mounting plate 53. A piston rod 67 projecting from the other end of the cylinder 64 has a pivot pin and clevis connection 68 with one side 69 of the post driver housing 32. As the motor 64 is operated to move the piston rod 67 to and from an extended position in the cylinder 64, the post driver 8 will be tilted with a pivoting movement about the axis of the bearing 60.

Adjustment of the position of the post driver 8 about the pivot axis of the trunnions 55 is controlled by the motor 62 which has a double clevis connection at opposite ends with the post driver 8 and with the supporting frame 17. As shown in FIGURE 5 the motor 62 comprises a cylinder 71 that has a clevis 72 at one end connected by a pivot pin 73 to a tongue 74 at one end of a connecting member 75. The connecting member 75 has a bend at its center so that it provides a tongue 76 at its other end which is at right angles to the tongue 74. The tongue 76 is connected by a pivot pin 77 to the outer ends of a pair of bars 78 that have welded connections at their inner ends 79 with the frame side bars 40. A similar connecting member 80 having tongues 81 and 82 at right angles to each other connects the other end of the motor 62 with the driving post 8. The tongue 82 is connected by a pivot pin 83 with a clevis 84 on the outer end of the piston rod 85 of the motor 62, while the tongue 81 is connected by a pivot pin 86 between a pair of lugs 87 that project outwardly from the center portion of the surface 59 of the post housing 32. Operation of the motor 62 to move the piston rod 85 to and from an extended position in the cylinder 71 operates to tilt the post driver 8 about the axis of its trunnion supports 55. The double clevis connection that is provided by the connecting member 75 and 80 at opposite ends of the motor 62 provides for a tilting movement of the post driver 8 about the axis of the bearing 60 by the motor 61 and enables operation of the motor 62 to tilt the post driver 8 about the axis of the trunnions 55 in any tilted position to which it is moved by the motor 61.

In operation, the carriage 1 is drawn forwardly by the tractor 6 to string fence wire 7 along a line of fence posts 2 as described above. At spaced intervals along the fence line, the apparatus is stopped for installation of fence posts 2 by the post driver 8. When the apparatus is stopped for installation of a fence post, the post driver 8 will occupy a position that is determined by the contour of the ground on which the tractor 3 and the carriage 1 is supported. If it occupies a position with the center line of the guide housing 32 of the post driver 8 inclined relative to the vertical, the motors 61 and 62 are operated to adjust the post driver guide housing 32 to a vertical position. After an adjustment of this character, the lever 44 is manually operated, if necessary, to shift the frame 17 on the draft bar 12 to a position in which the post driver 8 is centered over the line of fence posts. The operations required for centering the post driver 8 in a vertical position over the fence line can be performed readily by an operator standing on the platform 19.

While one embodiment of my invention has been shown and described it will be apparent that other adaptations and modifications may be made without departing from the scope of the following claims.

I claim:

1. A tractor support for a fence post driver comprising the combination with a fence post driver having a fence post driving element and a guide housing in which it has guided movement along a rectilinear path, a pair of laterally spaced tractor hitch links, and a draft bar supported by said links, of a supporting frame mounted in a vertical position on said draft bar, a pair of laterally spaced brackets on said frame in positions above and extending outwardly from said said draft bar, a supporting plate having trunnions at opposite ends thereof pivotally supported on said brackets, a bearing on said plate arranged with its axis extending transversely of the axis of said plate trunnions, means mounting said housing on said plate including a shaft journaled in said bearing and supporting said housing for pivotal movement about said bearing axis, and separate means for adjusting the pivotal positions respectively of said housing on said plate and of said plate on said frame brackets to arrange said housing in a position in which the said path of movement of said driving element extends vertically.

2. An apparatus as defined in claim 1 characterized by the mounting of said vertical frame on said draft bar including means providing for lateral movement of said frame on said draft bar, and means for adjusting the position of said frame on said draft bar.

3. A tractor support as defined in claim 2 characterized by said frame adjusting means comprising a supporting bracket secured against movement relative to said draft bar, a manually operable lever pivoted on said bracket for movement about an axis parallel to said draft bar, a bell-crank pivotally mounted on said bracket, and means connecting the arms of said bell-crank respectively with said frame and with said lever.

4. A tractor support for a fence post driver comprising the combination with a fence post driver having a fence post driving element and a guide housing in which it has guided movement along a rectilinear path, a pair of laterally spaced tractor hitch links, and a draft bar supported by said links, of a supporting frame mounted in a vertical position on said draft bar, a pair of laterally spaced brackets on said frame in positions above and extending outwardly from said draft bar, a supporting plate having trunnions at opposite ends thereof pivotally supported on said brackets, a bearing on said plate arranged with its axis extending transversely of the axis of said plate trunnions, means mounting said housing on said plate including a shaft journaled in said bearing and supporting said housing for pivotal movement about said bearing axis, and means for pivoting said housing to a position in which the said path of movement of said driving element extends vertically comprising a first double-acting expansible chamber fluid pressure motor having pivotal connections at opposite ends thereof respectively with said frame and said housing, and a second double-acting expansible chamber fluid pressure motor having pivotal connections at opposite ends thereof respectively with said supporting plate and said housing.

5. Apparatus as defined in claim 4 characterized by each of the said pivotal connections at opposite ends of said first motor comprising a pair of axially spaced clevis pin connections providing for pivotal movement of said first motor about axes extending transversely relative to each other.

References Cited in the file of this patent

UNITED STATES PATENTS

| | | |
|---|---|---|
| 293,021 | Hiatt | Feb. 5, 1884 |
| 412,974 | Mowers et al. | Oct. 15, 1889 |
| 722,985 | Inggoldsby | Mar. 17, 1903 |
| 2,476,390 | Simmons | July 19, 1949 |
| 2,659,583 | Dorkins | Nov. 17, 1953 |
| 2,659,584 | Dorkins | Nov. 17, 1953 |
| 2,731,892 | Simmonds | Jan. 24, 1956 |
| 2,928,322 | Spitzer | Mar. 15, 1960 |
| 2,998,856 | Larsen et al. | Sept. 5, 1961 |